June 2, 1931. E. GATHMANN Re. 18,084

INGOT MOLD TOP

Original Filed Aug. 20, 1923 2 Sheets-Sheet 1

Emil Gathmann, Inventor,

By Baldwin & Wight

Attorneys.

June 2, 1931. E. GATHMANN Re. 18,084

INGOT MOLD TOP

Original Filed Aug. 20, 1923 2 Sheets-Sheet 2

Inventor,
Emil Gathmann,
By Baldwin & Wight
Attorneys

Reissued June 2, 1931

Re. 18,084

UNITED STATES PATENT OFFICE

EMIL GATHMANN, OF BALTIMORE, MARYLAND, ASSIGNOR TO THE GATHMANN ENGINEERING COMPANY, OF BALTIMORE, MARYLAND, A CORPORATION OF MARYLAND

INGOT MOLD TOP

Original No. 1,621,402, dated March 15, 1927, Serial No. 658,371, filed August 20, 1923. Application for reissue filed March 12, 1929. Serial No. 346,460.

This invention relates to the casting of ingots from either steel which has been deoxidized as much as possible or from partially deoxidized steel and it involves certain improvements in the shape or contour of the mold top.

One object of the invention is to so construct or shape the chamber of the mold top that the portion of the ingot formed therein may have such shape as to permit of its free contraction without interference or hindrance to such contraction from the walls of the mold top to thus prevent undue or harmful stressing of the outer walls or skin of the ingot.

A further object of the invention is to so form the chamber of the mold top that the portion of the ingot produced therein is shaped in such manner that it is adaptable for rolling or reduction into blooms or slabs when reheated without danger of excessive tears or surface reduction cracks.

According to my present invention I provide a shrink head casing for molds having corners and salients of such kind and of such novel shape as to properly match within the top of a mold chamber provided with a similar contour of corners and salients.

The mold top is preferably made of fire brick or other good heat insulating refractory material and it may be formed in one piece or in sections and is of such size as to leave clear annular spaces between its outer side walls and the inner walls of a mold chamber, which spaces are of such width as to permit of the top being readily moved into the mold chamber and withdrawn therefrom, but sufficiently narrow so that the molten metal will not pass freely through the space when the mold is poured.

The invention is clearly illustrated in the accompanying drawings, in which.

Figure 1:
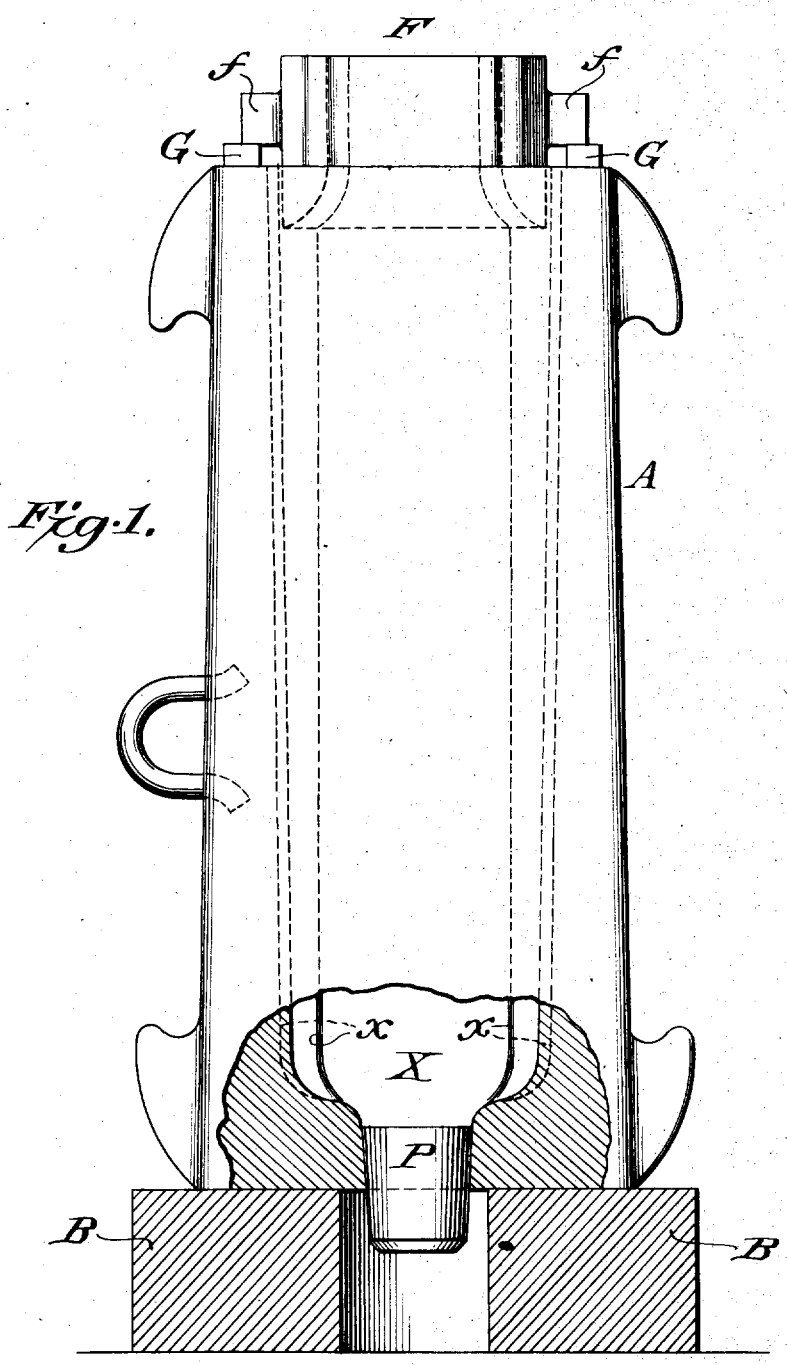
Figure 1 is a view partly in side elevation and partly in vertical section of a mold in connection with which the mold top is used, my improvements in this instance being applied to a big-end-up mold mounted on a suitable support or stool.
Figure 2:
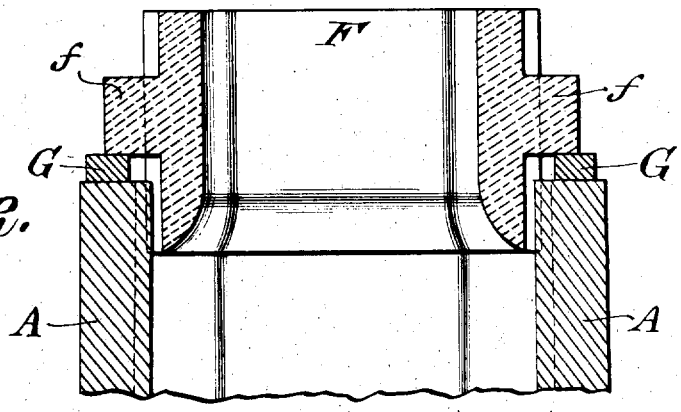
Figure 2 is a detail view in section of the upper portion of the mold proper and of the shrink head casing.

The mold A shown in Figure 1 is a big-end-up mold. The mold chamber is corrugated and is provided with corners and salients in the manner most clearly shown in Figure 3, and these features are hereinafter described. The lower portion of the mold is necked-in as indicated at X, the corrugations $x$ merging into the necked-in part of the mold as shown. The opening in the bottom of the mold is closed by a plug P which is of service in the stripping of the ingot from the mold when cast. The mold rests on a stool B of usual construction for Gathmann big-end-up molds.

The mold top is marked F in the drawings and it is formed with laterally projecting lugs $f$. These lugs are preferably located intermediate between the upper and lower ends of the mold top and preferably they rest on wedges or blocks G which hold the mold top at the desired elevation.

Figure 3:
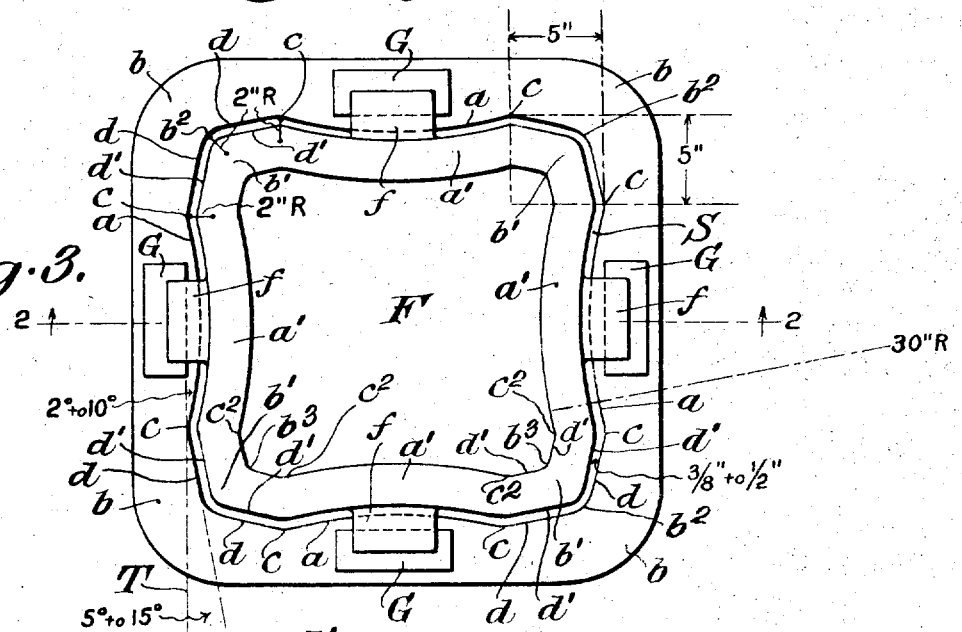
Figure 3 is a top plan view of the mold and mold top.
Figure 4:
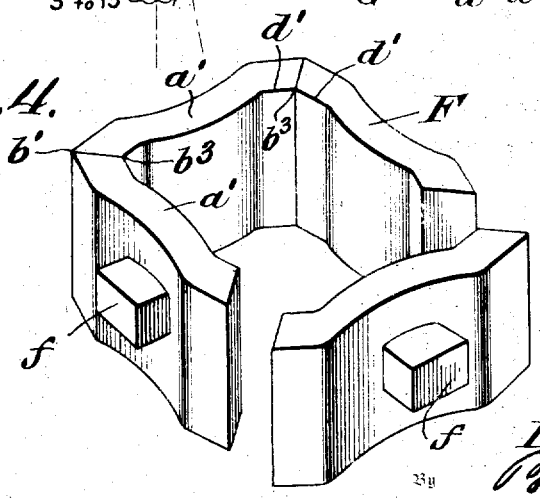
Figure 4 is a perspective view of a modified form of the shrink head casing which is in this instance made in sections.

As indicated in Figure 3, the mold top or shrink head casing has four primary side walls $a$, $a'$ and eight secondary walls or salients $b$, $b'$, the secondary wall being connected to the primary walls by arc-shaped parts or salients $c$, $c^2$. Each secondary wall $b$, $b'$ extends at an angle of from 5° to 15° from a tangent T connecting the two apexes of the salient of each primary wall. The mold chamber is similarly formed.

The advantages of this construction are that the corners of the secondary walls where they join the salients are better acted upon by the rolls in the reduction of the ingot in the initial passes, thus more fully insuring the absence of breaks or cracks during the reduction operation.

In the preferred construction, the secondary or corner walls extend inwardly at an angle of from 5° to 15° from a tangent T connecting the two apexes of the salients of each primary wall.

It will be observed that the mold top, made in accordance with my invention has a plurality of side walls which concaved or are bellied inwardly toward the center of the mold top, the interior and exterior of the mold top having the same contour. These walls are oppositely arranged as shown. At each corner two primary side walls are connected on the outside by three outwardly curved salients there being an outwardly curved salient at the end of each primary side wall which connects by a straight wall *d* or *d'* with a centrally arranged corner salient $b^2$ or $b^3$.

Preferably the mold top is of the same thickness throughout except where the lugs *f* are formed where the sides of the feeder are thickened to that extent. It will be observed by reference to Figure 3 that the mold top is of substantially the same contour, both inside and outside as the mold chamber. The preferred radius for the salients at the corners is indicated in Figure 3. As shown, there is a two-inch radius for each of the three salients at each corner.

I claim as my invention:

1. A mold top for ingot molds having a chamber provided with four primary side walls of convex contour and four widened corners, each provided with three curved salients intervening between the adjacent primary side walls of the feeder.

2. An ingot mold top having a chamber provided with four primary side walls merging with four obtuse-angled corners, the faces of which lie at a tangent of from 5° to 15° to a line parallel with the vertex of the adjacent primary side wall.

3. A mold top made of refractory heat-insulating material having a chamber provided with four primary side walls of longitudinally-corrugated contour merging with four obtuse-angled corners, the faces of which lie at a tangent of from 5° to 15° to a line parallel with the vertex of the adjacent primary side wall.

In testimony whereof, I have hereunto subscribed my name.

EMIL GATHMANN.